Aug. 23, 1932.  E. A. FIELD ET AL  1,873,567

DRAFT STABILIZER

Filed Nov. 3, 1930   2 Sheets-Sheet 1

INVENTORS
Edward A. Field
Edward A. Field Jr.
BY Chappell Earl
ATTORNEYS

Aug. 23, 1932.  E. A. FIELD ET AL  1,873,567
DRAFT STABILIZER
Filed Nov. 3, 1930  2 Sheets-Sheet 2
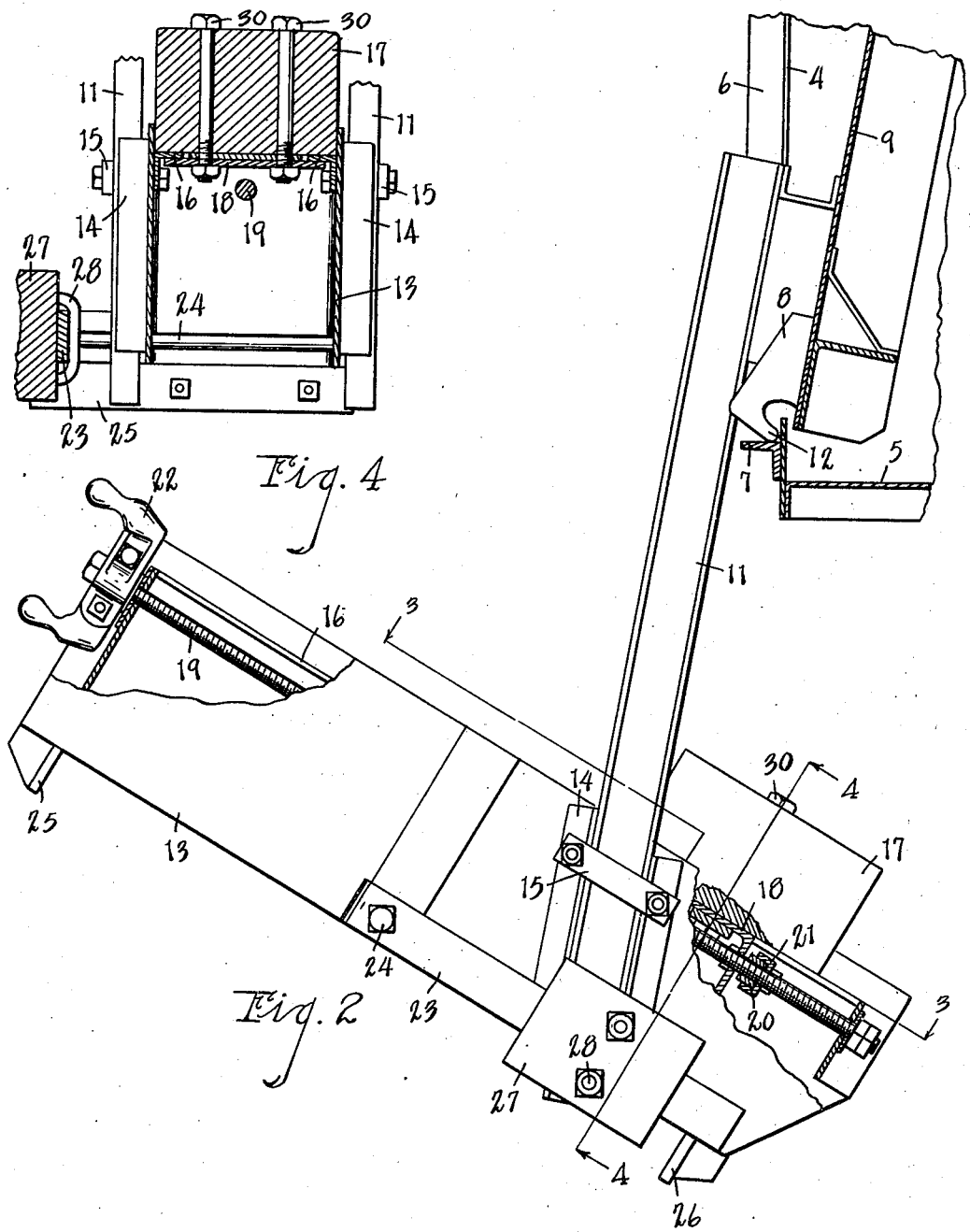
INVENTORS
Edward A. Field
Edward A. Field Jr.
BY Chappell Earl
ATTORNEYS Patented Aug. 23, 1932

1,873,567

UNITED STATES PATENT OFFICE

EDWARD A. FIELD AND EDWARD A. FIELD, JR., OF CHICAGO, ILLINOIS

DRAFT STABILIZER

Application filed November 3, 1930. Serial No. 492,988.

Our present invention relates to the type of draft stabilizer illustrated and described in our application for Letters Patent Serial No. 278,253, filed May 16, 1928, and is in certain respects an adaptation of and improvement over certain features of that application.

The main objects of this invention are:

First, to provide a draft stabilizer which insures a very accurate control means for installations of relatively high horsepower.

Second, to provide a stabilizing apparatus which may be very easily adjusted to secure the desired draft or meet the particular conditions.

Third, to provide an apparatus of this character which maintains a uniform draft control throughout the scope or range of operation, regardless of quantity of air handled or atmospheric conditions such as wind pressure, humidity and barometric conditions which frequently result in great variation in draft in ordinary steam or heating equipment.

Objects pertaining to details and economies of our invention will definitely appear from the description to follow. The invention is defined in the claims.

A structure which embodies the features of our invention is clearly illustrated in the accompanying drawings, in which:

Fig. 2 is an enlarged fragmentary side elevation partially in vertical section.

Fig. 4 is a fragmentary section on line 4—4 of Figs. 2 and 3.

Figure 1:
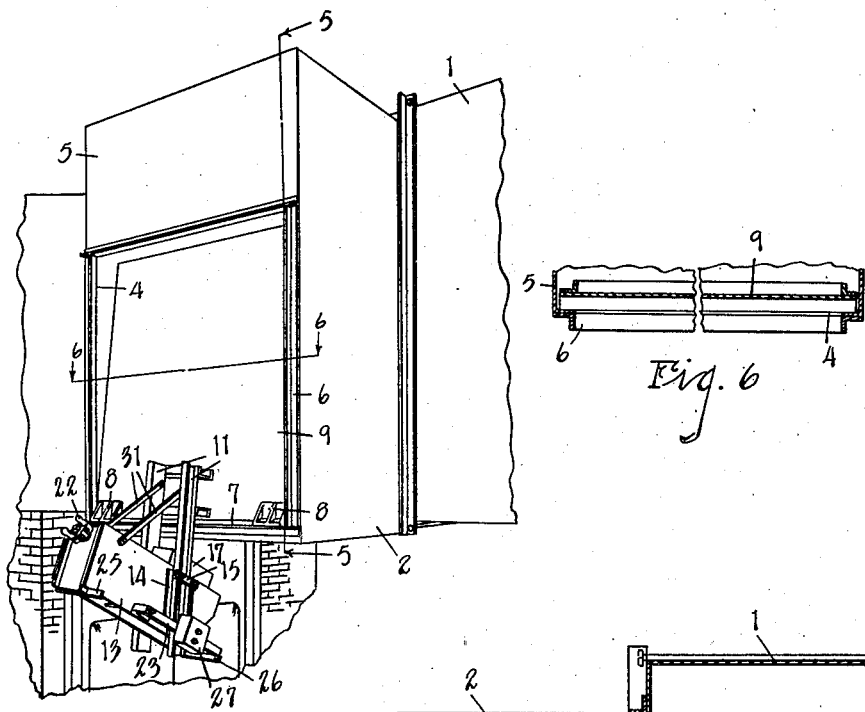
Fig. 1 is a fragmentary perspective view of our improved draft stabilizer in operative relation to a breeching of a steam or heating plant.

In the embodiment illustrated 1 represents the breeching of a steam or heating plant. We provide a housing 2 which is mounted on the side of the breeching 1, the breeching having an opening 3 therein embraced by the housing. The housing 2 has an opening 4 in its front wall 5, the upper edge of this opening being substantially spaced from the top of the housing. A reinforcing frame 6 is provided for the opening 4, the bottom 7 of this reinforcing frame constituting a support for the gate supporting arms 8.

Figure 6:
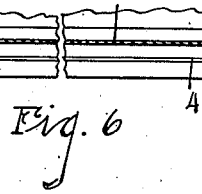
Fig. 6 is a fragmentary section on line 6—6 of Fig. 1.
Figure 3:
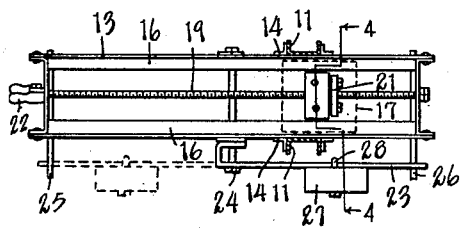
Fig. 3 is a fragmentary view partially in section on line 3—3 of Fig. 2.
Figure 5:
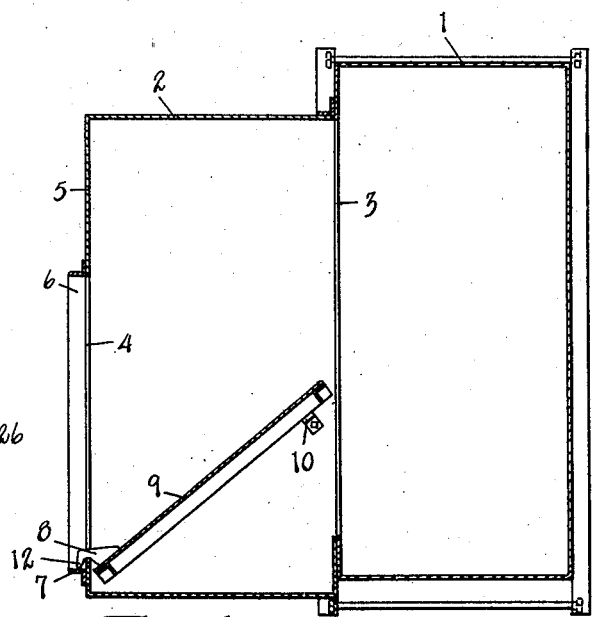
Fig. 5 is a vertical section on line 5—5 of Fig. 1.

The gate 9 is supported within the housing to close against the inside of the front wall, the gate swinging into the housing as shown in Fig. 5 when opening. A stop 10 limits the opening movement of the gate so that it does not swing into the breeching even when fully opened. The upper end of the gate is substantially spaced from the top of the housing so that there is a free flow or passage of air over the top of the gate when the gage is open. The side edges of the gate are close to the side walls of the housing as shown in Fig. 6 so that very little air can flow around the edges of the gage at any open position of the gate.

The gate is provided with a pair of spaced depending counterweight arms 11 which project a substantial distance below the pivots 12 of the supporting arms 8. These pivots 12 are in rocking or bearing engagement with the bottom member 7 of the frame as clearly illustrated in Fig. 2. This provides a mounting for the gate which permits its being readily removed as desired, and avoids the necessity of providing pintles and coacting hinge members.

We provide a frame-like counterweight support 13 having guides 14 on the side thereof slidably associated with the counterweight arms 11, the counterweight support being clamped in its adjusted positions on the arms by means of the clamps 15 so that the support may be adjusted and secured to any desired vertical position.

The support 13 is provided with ways 16 for the counterweight 17, and the counterweight is retained upon the ways by means of the plate 18 engaging beneath the ways, see Fig. 4. The counterweight is adjusted upon the ways by means of the screw 19 which is rotatably mounted on the support and coacts with a nut 20 secured to the weight by means of the holder 21. The screw is provided with a crank 22 by means of which it may be rotated to thereby adjust the weight and secure it in its adjusted positions.

An auxiliary weight supporting arm 23 is mounted on the pivot 24 on the side of the support 13 and adapted to be swung to a forward or rearward position and into engagement with either of the rests 25 and 26. The auxiliary weight 27 is adjustably secured to this arm by means of the U bolt 28. The purpose of this auxiliary weight will appear later.

With the parts thus arranged they may be adjusted so that the combined mass, that is, the gate, counterweight and supporting parts carried by the pivots 12, may be accurately balanced with the gate in closed position. This is accomplished by adjusting the support 13 vertically on its supporting arms with the counterweight and the auxiliary weight in the rear position, and all adjustments of the counterweights in action or for operative purposes are to begin at that point.

With the parts adjusted in a counterbalancing relation, the counterweight 17 is adjusted so as to resist or hold the gate closed up to a certain pull or draft, and anything in excess of that tends to open the gate.

As the control in order to be effective must be constant, we have mounted the counterweight so that the torque arm whose measure is the horizontal distance from the combined center of mass to the pivot decreases as the gate opens. That is accomplished by mounting the counterweight for adjustment in a plane forming an angle of the vertical plane of the pivot and so that the combined center of mass moves toward the vertical plane of the pivot as the gate opens.

The auxiliary weight 27 is provided for quick adjustment, that is, it may be thrown to its rearward position as shown in Fig. 2 in the normal operation of the plant, but in the event an extra draft is desired, as, for example, in getting up steam or increasing the draft for a limited period, the arm 23 is swung to the forward position resting upon the stop 25. This avoids the necessity for adjustment of the weight 17.

The plate 18 is secured to the weight 17 by means of the bolts 30 so that, if desired, when the weight has been properly adjusted, it may be clamped upon the ways, thus preventing free manipulation, although the screw is effective in holding the weight in its adjusted position. However, it is found that operators sometimes unnecessarily manipulate the weight, and clamping it upon the ways is a deterrent to such manipulation.

After the screw has been balanced by the vertical adjustment of the support 13, we preferably add the braces 31 which are not only effective as braces but act as a deterrent to undesired adjustment of the apparatus.

The structure illustrated is especially designed for the larger installations and has a wide range of adaptation. While we have illustrated the same in relation to a breeching, it may be readily adapted to chimneys or draft elements of various types.

We have not attempted to illustrate or describe certain modifications and adaptations which we have found desirable in commercial practice as we believe this disclosure will enable those skilled in the art to embody or adapt our improvements as may be desired.

Having thus described our invention what we claim as new and desire to secure by Letters Patent is:

1. In an apparatus of the class described, the combination of a pivotally mounted stabilizer gate, a pair of counterweight arms mounted on the gate and depending substantially below the pivot thereof, a counterweight support mounted on said arms for vertical adjustment and provided with a way extending between the arms disposed in an upwardly inclined relation relative thereto, a counterweight adjustably supported on said way, and a screw mounted on said support in parallel relation to said way and operatively connected to said weight.

2. In an apparatus of the class described, the combination of a pivotally mounted stabilizer gate, a pair of counterweight arms mounted on the gate and depending substantially below the pivot thereof, a counterweight support mounted on said arms for vertical adjustment and provided with a way extending between the arms disposed in an upwardly inclined relation relative thereto, and a counterweight adjustably supported on said way.

3. In an apparatus of the class described, the combination of a pivotally mounted stabilizer gate, a pair of counterweight arms mounted on the gate and depending substantially below the pivot thereof, a counterweight support mounted on said arms for vertical adjustment and provided with a way extending between the arms disposed in an upwardly inclined relation relative thereto, a counterweight adjustably supported on said way, an auxiliary weight, and a supporting arm therefor pivotally mounted on said support, said support being provided with rests disposed at the front and at the rear of the arm pivot.

4. In an apparatus of the class described, the combination of a stabilizer gate pivotally mounted at its lower end, an arm carried by said gate and projecting below its pivot, a counterweight support mounted on said arm and provided with a way disposed in a plane forming an angle to the vertical plane of the gate pivot, a screw mounted on said support in parallel relation to said way, a counterweight adjustably supported by said way and operatively associated with said screw, and an auxiliary weight mounted on said support to swing in a plane parallel to the vertical plane of the way.

5. In an apparatus of the class described, the combination of a stabilizer gate pivotally mounted at its lower end, an arm carried by said gate and projecting below its pivot, a counterweight support mounted on said arm and provided with a way disposed in a plane forming an angle to the vertical plane of the gate pivot, a screw mounted on said support in parallel relation to said way, and a counterweight adjustably supported by said way and operatively associated with said screw.

6. In an apparatus of the class described, the combination of a stabilizer gate pivotally mounted at its lower end, an arm carried by said gate and projecting below its pivot, a counterweight support mounted on said arm and provided with a way disposed in a plane forming an angle to the vertical plane of the gate pivot, a counterweight adjustably supported by said way, and an auxiliary weight mounted on said support to swing in a plane parallel to the vertical plane of the way.

7. In an apparatus of the class described, the combination of a pivotally mounted stabilizer gate, an arm mounted on the gate and depending below the pivot thereof, a counterweight support mounted on said arm to project laterally therefrom, a counterweight adjustably mounted on said support, a means for adjusting said counterweight on said support, an auxiliary weight carrying arm pivotally mounted on said support to swing in a plane parallel to the vertical plane of the support, said support being provided with rests for said arm in its forward or rearward position, and a weight on said arm, said weight being mounted for adjustment on said arm.

In witness whereof we have hereunto set our hands.

EDWARD A. FIELD.
EDWARD A. FIELD, Jr.